(12) United States Patent
Bechtel

(10) Patent No.: US 7,929,736 B2
(45) Date of Patent: *Apr. 19, 2011

(54) FINGER GUIDE DEVICE FOR USE WITH STYLUS OR PEN

(75) Inventor: J. Scott Bechtel, Lafayette, IN (US)

(73) Assignee: Pen-One, Inc., Greensboro, NC (US)

( * ) Notice: Subject to any disclaimer, the term of this patent is extended or adjusted under 35 U.S.C. 154(b) by 875 days.

This patent is subject to a terminal disclaimer.

(21) Appl. No.: 11/266,932

(22) Filed: Nov. 4, 2005

(65) Prior Publication Data

US 2008/0115981 A1 May 22, 2008

Related U.S. Application Data

(60) Provisional application No. 60/624,304, filed on Nov. 3, 2004, provisional application No. 60/629,846, filed on Nov. 22, 2004.

(51) Int. Cl.
*G06K 9/00* (2006.01)

(52) U.S. Cl. ....... 382/124; 382/126; 340/5.53; 340/5.83

(58) Field of Classification Search .................. 382/124, 382/126; 340/5.53, 5.83
See application file for complete search history.

(56) References Cited

U.S. PATENT DOCUMENTS

| | | | |
|---|---|---|---|
| 5,177,802 A | | 1/1993 | Fujimoto |
| 5,818,956 A | | 10/1998 | Tuli |
| 5,991,431 A | * | 11/1999 | Borza et al. .................. 382/127 |
| 6,373,969 B1 | * | 4/2002 | Adler ............................. 382/127 |
| 6,539,101 B1 | * | 3/2003 | Black ............................. 382/124 |
| 6,924,496 B2 | | 8/2005 | Manansala |
| 7,146,029 B2 | | 12/2006 | Manansala .................... 382/126 |
| 2002/0081005 A1 | * | 6/2002 | Black ............................. 382/124 |
| 2004/0076314 A1 | | 4/2004 | Cheng ........................... 382/126 |
| 2004/0124246 A1 | * | 7/2004 | Allen et al. .................... 235/492 |

FOREIGN PATENT DOCUMENTS

DE 198 20 026 9/1999
(Continued)

OTHER PUBLICATIONS

Bechtel, J.S. et al. "Developing The World's First Biometric Writing Instrument", Internet Citation, Jan. 30, 2004, XP007900991 (the whole document).

(Continued)

*Primary Examiner* — John B Strege
(74) *Attorney, Agent, or Firm* — MacCord Mason PLLC

(57) ABSTRACT

A finger guide positions a finger on a fingerprint sensor in a manner optimal for the operation of authentication or identification while grasping a stylus. The finger guide may also be used for enrollment of the initial fingerprint data into the system through one or more readings of generally the same relevant portions of the fingerprint for translation into a template for future comparison. The finger guide non-forcibly guides the subject writer's finger into a position where a relevant portion of the finger is aligned with the fingerprint sensor so that said relevant portion of the sensed fingerprint correlate with generally same relevant portions of the fingerprint previously translated into the template. The finger guide and stylus may be used with a dynamic signature verification system to authenticate or identify the writer or to verify that the writer has signed his name.

21 Claims, 7 Drawing Sheets

FOREIGN PATENT DOCUMENTS

| | | |
|---|---|---|
| EP | 1 197 911 | 4/2002 |
| EP | 1286298 | 8/2002 |
| JP | S61-175868 | 1/1985 |
| JP | H3-156691 | 11/1989 |
| JP | 2012381 | 1/1990 |
| JP | 3226888 | 10/1991 |
| JP | H10-269344 | 3/1997 |
| JP | 10269344 | 10/1998 |
| JP | 11232423 | 8/1999 |
| JP | 2001143056 | 5/2001 |
| JP | 2001266108 | 9/2001 |
| WO | WO99/52060 | 4/1999 |
| WO | WO 00/39743 | 7/2000 |
| WO | WO 01/22349 | 3/2001 |
| WO | WO 9952060 | 9/2002 |

OTHER PUBLICATIONS

Supplementary European Search Report (Jan. 3, 2008), EP 05 84 7775.

* cited by examiner

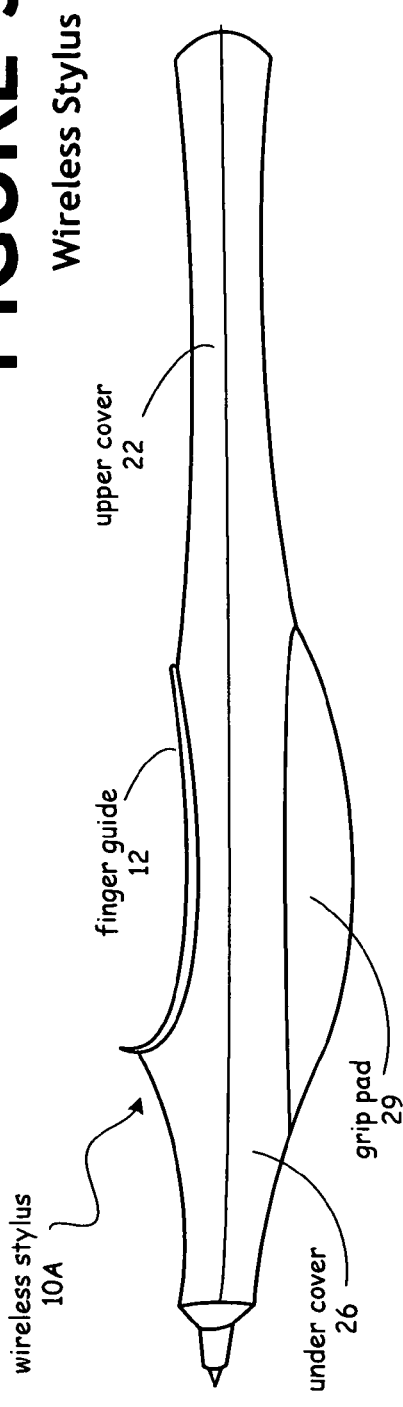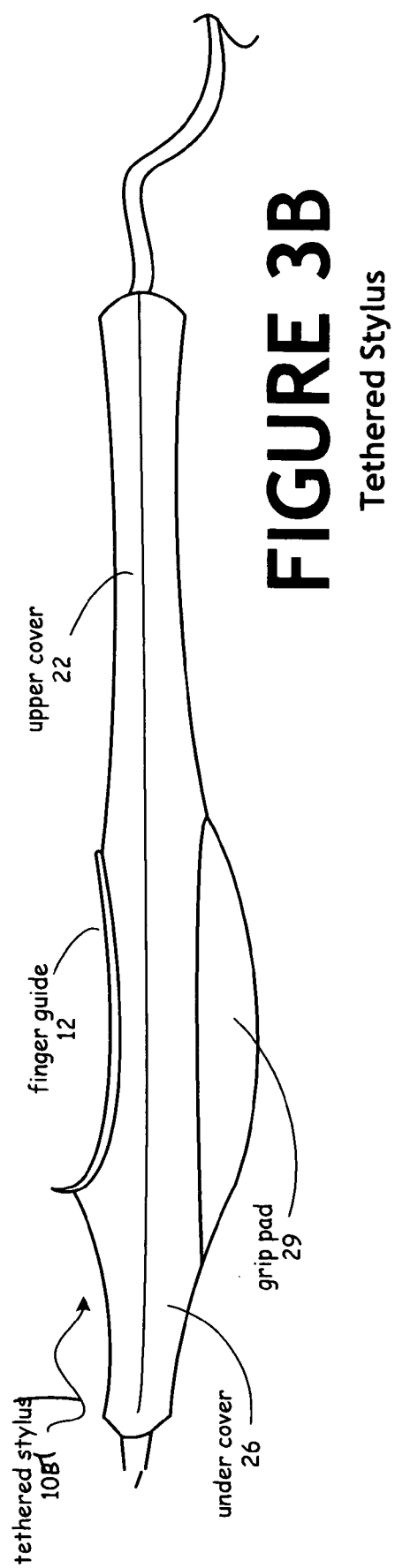

Signature Pad

POS Terminal

FINGER GUIDE DEVICE FOR USE WITH STYLUS OR PEN

CROSS-REFERENCE TO RELATED APPLICATIONS

This application claims priority to U.S. Provisional Application No. 60/624,304 entitled "Finger Guide" filed on 3 Nov. 2004, by J. Scott Bechtel; and U.S. Provisional Application No. 60/629,846 entitled "Finger Guide Device" filed on 22 Nov. 2004, by J. Scott Bechtel.

FIELD OF THE INVENTION

The invention relates generally to a finger guide called a finger guide device used to position a finger, thumb or human digit containing unique minutiae upon a scanner or sensor or other means to capture an image of the miniature features of a substantial and relevant portion of the said minutiae, which is equivalently called a fingerprint. This finger guide device would be used with electronic, optical, electroluminescent, electromagnetic, capacitive, pressure based, or similar scanners or sensors requiring repeated and reasonably accurate finger positioning in alignment with the scanner or sensor, the sensor or scanner being disposed in a stylus or pen. Applications include the accurate authentication or identification of an individual or of specific finger of an individual with a minimal number of false rejects or repeats of the process for scanning, sensing, or capturing a relevant and previously enrolled portion of the fingerprint.

BACKGROUND OF THE INVENTION

U.S. Patent Application No. 2004101172 (Lane) discloses a finger imaging system for receiving the finger of a person being fingerprinted by an automated fingerprint reader. The system includes a finger imaging device having a finger receiving portion for receiving the finger to be fingerprinted. Extending outward from the finger receiving surface is a locator bar that engages a skin crease of the subject finger when it is in about in the desired position. U.S. Patent Application 2004101171 (Lane et al.) discloses a finger imaging system for receiving and holding a finger of a person being fingerprinted by an automated fingerprint reader. The system includes a finger imaging device having a finger receiving portion and a finger positioning portion, together forming a recess of reducing dimension such that a subject finger forcibly inserted into it is held in a stable position. And finally, U.S. Patent Application No. US2004076314 (Cheng) discloses an apparatus that includes a fingerprint sensor and a guiding means. The sensing site of the fingerprint sensor makes a relative and obtuse angle with a guiding plane of the guiding means.

Traditionally, in order to record a fingerprint, ink was applied to a finger and then the finger was "rolled" across a paper or other ink receptive surface to print an image of the fingerprint. Fingerprints left by touching a surface and leaving oil residue are captured forensically by a variety of process techniques that "lift" and reveal the fingerprint.

In more recent years, alternative technologies have been developed that can reveal the fine features within a fingerprint and capture the fingerprint directly from the finger or from the living tissue under the surface of the finger skin which grows outward to become the finger minutiae. Electronic sensing technology involves holding the finger on a sensing system as the system detects skin or tissue differences across the finger area or just a portion of the finger area in order to reveal an image of the print or in order to create an electronic representation of the fingerprint, for example as a digital file. Examples include optical scanners, electroluminescent pressure sensitive systems, integrated circuits with the ability to measure individual pixel sized capacitance, and more.

The production cost for some types of fingerprint scanning systems is driven by the size of the finger area to be sensed. This is especially true for silicon based or integrated circuit (IC) type sensors. Like most IC's, the larger the IC, the more costly it is to produce assuming equal device geometries and layer counts. The production cost of the sensor is directly related to the sensing area, and mass production of sensors the size of a thumb is not optimal when only a relevant portion of a finger needs to be scanned in order to build a fingerprint authentication system. If just a relevant portion of the print is to be used in order to reduce system cost, then it becomes important to place nearly the same relevant portion of the finger that was originally enrolled upon the sensor for every authentication or identification event.

Clearly a smaller sensor would cost less and, assuming the relevant area of the finger sensed is still necessarily large enough to provide an acceptable matching capability or security level, then the optimal solution would be this smaller sensor, leaving out significant portions of the total fingerprint area. The finger guide device of the present invention is a device which may be used to reliably reposition a finger upon a small sensor to enable more efficient identification. The device reduces false rejects caused by failure to position the finger close enough to its original enrollment position or positions. The finger guide device assures that the sensor can read matching relevant portions of the fingerprint, which is to stipulate reading generally the same relevant portions as those captured and stored in a template used for comparison and matching. The finger guide device reduces the incidence of false rejects by naturally (for example, comfortably or intuitively) and non-forcibly guiding the subject finger to approximately (generally) the same and original enrollment position each time the fingerprint identification system is used.

When smaller sensors are used, if the finger is enrolled in a manner that scans one relevant portion of the finger, or perhaps several overlapping portions of the finger's print area which are then electronically assembled by a computer into a completed "template" representing a larger portion of the original subject's fingerprint than any single scan could produce alone, then the system depends upon the subject user being able to touch the sensor consistently in the same approximate place so that a matching relevant portion of the finger is read by the sensor so that accurate authentication may take place. Failure to replace the finger accurately in generally the same location causes false rejects; or, in other words, because the sensor sees a different and irrelevant area of the finger then it can not match with the data from previously enrolled relevant fingerprint portions in the template, and it rejects a known acceptable subject user. This is a false reject. If the system permits additional attempts, and if the second or subsequent try finally aligns the minutiae containing a relevant portion of the fingerprint matching a portion originally stored during enrollment, the subject will then be accepted (identified or "authenticated"). The finger guide device reduces the average number of attempts to authenticate known subjects by providing a simple, generally oval or rectangular funnel like guide for the finger that physically encourages the finger into the correct position and provides a variety of tactile feedback means for the subject user in order to make it easier to "find" the right position again, even after substantial time has passed between enrollment and the next authentication event. In contrast, with basic flat surface sensors or sensors surrounded by generally flat surfaces or even poorly designed sensors, this false reject rate for untrained subjects can range from ten to fifteen percent of all attempts, or even higher with different system settings.

SUMMARY OF THE INVENTION

Much like a generally round, oval, square, or rectangular funnel guides a fluid into a container; the finger guide device or finger "depression" (recess) serves to guide the finger towards the same position on the sensor in a repeatable manner. Another simple analogy is to describe a ball on the point of a pyramid, which is unstable versus a ball sitting at a global minimum in an inverted pyramid or recess, wherein the ball always rolls to the same global minimum position through the action of gravity and the sidewalls of the recess. In the case of the finger guide device, less obvious action is initiated by muscles applying reasonable force to easily slide the finger towards the sensor area, such movement being guided by described and disclosed physical, material, and tactile elements in the finger guide device to guide the finger to the same location each time through communication to the subject user and natural movement towards said location also being effected by tactile feedback from the ergonomically designed sidewalls of the device. The sensor would sit within a window at the bottom of the finger guide device in correct position adjacent to the desired relevant area of the finger in order to "see" the preferred portion (projection) of the fingerprint.

Previous devices to locate fingers for fingerprint imaging focused upon the need to hold (almost press) the finger against a flat scanning surface and tended to either locate the finger crudely from the front edge of the nail or the skin crease located under the first joint in the finger. The intent seemed to be to substitute for the effect of rolling a print and pressure to flatten the finger seemed to be an important element. Modern semiconductor sensors require only a light touch and, as noted, often focus on repeating the scan or capture of generally the same relevant sections of the fingerprint over and over again as long as the finger remains in generally active alignment with the sensor. The invention provides an effective aid and a learning mechanism that assists subjects in positioning the finger in the right place on a repeatable basis with the relevant portions of the finger in alignment with the scanner or sensor and in developing the right touch (pressure) as well through a set of means including physical shape, feedback means, and material properties. In addition, the device is designed to non-forcibly relocate an area of the print about between 0.20 and 0.90 inch in distance from the underside of the fingernail, and, as such, locates from the finger tip below the nail rather than the ridge under the first joint in the finger. In addition, the finger guide device ridge at the front is of a low enough profile to avoid contact with the fingernail. Such contact would introduce error because different subjects trim their nails to different lengths, sometimes at different times, and most would also find pressure against the nail tip uncomfortable, both conditions having been found in previous devices to help position a finger upon a fingerprint reader or scanner.

The physical design of the finger guide device enables sufficiently accurate placement of the relevant portion of the finger over the center of the sensor to facilitate a substantial increase in the percentage of first time acceptance (of enrolled subjects). This includes a relatively short concave radius (or relatively steep slope) at the front of the finger guide device where the finger tip just below the finger nail touches or is proximal to the front of the finger guide device and a longer radius concave shape (or less steep slope) adjacent to the opposite side of the sensor where the cup extends up the finger towards the body. The sides are quite steep on either side of the scanner or sensor area to keep the relevant portion of the finger centered laterally over the scanner or sensor. Overall, the finger guide device is sized for an average finger, yet accommodates a wide range of digit sizes because it only interfaces with a small relevant portion of the finger or digit.

The tolerance allowed for finger placement on smaller electronic sensors mounted on flat surfaces is fairly liberal, yet positioning a relevant portion of the finger on these devices without the benefit of the finger guide device remains challenging for untrained subjects. This might be limited to approximately half to two thirds of the finger print area that will be scanned as overlapping with other relevant portions of the fingerprint previously scanned and existing in the template, depending on the algorithm used and accuracy of the system. Low accuracy systems may operate with even less than half a sensor window overlap between an authentication scan and its corresponding relevant portion within the stored template. The actual relevant portion required for a security match depends upon the algorithm and, within the algorithm, the actual desired security level or security setting. This is related to the relevant portion of the scanned subject print that correlates with the subject's enrolled template.

The ability to place the same relevant portion of the print opposite the active area (window) of the sensor on a consistent and repeatable basis helps facilitate rapid and accurate first try matching and this reduces the false reject rate substantially. The finger guide device invention reduces false rejects among enrolled, but unpracticed subjects to less than ten percent. Practice using the finger guide device or system optimization or the combination of both will further reduce the false reject rate; and, under ideal conditions with an optimized system, the finger guide device in a stylus or pen can reduce false rejects to less than two percent.

This reduction in false reject rates from a range of between 10 and 20 percent of trials and having an average of about 15 percent to less than two percent makes a significant difference in pen or stylus based security system acceptance and marketability. Frustration within the subject user population is substantially reduced if people do not need to touch the sensor multiple times to be accepted. This is particularly important in a pen or stylus application wherein special user dexterity is often required to lift and replace the finger for each additional authentication attempt. As an aid to reduce special dexterity demands and help facilitate this required physical manipulation of the device some fingerprint equipped pens include special pliant grips or non slip grip surfaces.

In late 2003 a new keyboard was introduced to approximately 250,000 users and had no finger guide device solution. There was considerable frustration in the user base and the company that deployed the system faced considerable criticism. Such problems cause users to question how well a system works, even though the problem may be technically termed user error or the fault of the user because of inaccurate finger placement (misalignment with the sensor) during the authentication process. The finger guide device reduces this expected user error and increases the likelihood of subject acceptance on the first touch. This saves a great deal of time over the life of a system and is a critical element to developing biometric systems that are consistently competitive with passwords or PINs in terms of user time and efficiency.

Using the finger guide device for both enrollment and authentication enhances the efficacy of the finger guide device in actual practice and application. This is because the natural feel of the finger guide device ergonomically guides users to approximately the same position or alignment of a relevant portion of the finger above the active sensing area each time. This guiding process is both physical and neural, so providing tactile feedback that is important to first use and subsequent learning.

During enrollment, the system may ask the subject to remove the finger and touch the finger to the scanner or sensor several times (e.g., "lift and replace" the finger). The finger guide device is generally designed to accommodate fingers or thumbs from left or right appendages. This means that it aids this multiple placement but does not strictly limit placement to an exact and precisely repeatable exact placement, it simply brings the placement within the tolerance ranges of the sensor and algorithm so that a relevant portion of the subject's finger is aligned opposite a scanner or sensor. This allows for the template to extend beyond the strict limits of the ideal or "perfect" window frame (projection) and thus create a template that has guard banding designed in for the purpose of accommodating reasonable levels of future misalignment within the tolerance and guiding capability of the finger guide device. This function is important to long term, repeatable performance, and the alignment improvement facilitated by the finger guide device need only rise to the limits required by the matching system, including but not limited to template dimensions and security level of the algorithm.

Some sensors drive an electrical potential or electromagnetic signal into the finger tissue. This may be a radio frequency signal. The finger guide device or its surface may be electrically conductive to aid these applications during enrollment and subsequent authentication events. The finger guide device may be designed into a preferred embodiment with a generally parabolic shape to focus reflected electromagnetic energy upon relevant portions of the finger in a process called illumination and to improve the characteristics of the information being sensed.

The surface properties and material selected for the finger guide device are important to performance. Since the finger must slide easily into position, low coefficients of friction (both sliding coefficient and static coefficient) are useful to permit the finger to come to rest at its natural global minimum, which is at the bottom of the finger guide device properly positioned upon the scanner or sensor. This surface property and resulting process positions the finger in the same proximal location time and time again. Examples of materials with suitably low coefficients of friction include but are not limited to smooth metals, smooth plastics, and even painted, polished, or waxed surfaces. If the surface material had a high coefficient of friction for example, rubber, urethane based materials, or rough plastics, the utility and function of the finger guide device may be reduced or compromised. Wet or dry lubricants and waxes may also be applied and suitable lubricants may even be mixed into cleaning solutions or special cleaning wipes.

Other feedback means may be included in preferred or even alternate embodiments of the invention. Humans will develop the ability to feel the right position as they gain experience with the finger guide device. The finger guide device may be made of a material with a high thermal conductivity to provide tactile feedback and accelerate this learning process. Examples include but are not limited to metals, certain ceramics, or certain carbon-based materials. In this case, the finger guide device would tend to feel cold to the touch at room temperature (relative to other parts of the pen or stylus), not because of its absolute temperature but because it has a thermal conductivity that conducts heat quickly out of the skin when touched, thus quickly cooling the sensitive surface of the finger upon contact. If the finger guide device is made of metal, this property will make it feel like metal to the touch (e.g.—cold feeling). By feeling colder than the rest of the pen and colder than the silicon sensor and its surface coating, the subject will learn the correct "feel" of the finger guide device and will also better feel the sensor.

Additional bumps may be added to help orient the finger or enable subjects to "fine tune" their finger position. These may be unnecessary for normal or average sized fingers but may be worthwhile in applications where the subjects have very small fingers that contact little of the finger guide device's surface area.

Braille may be added to the finger guide device for assisting blind or visually impaired users.

The finger guide device may also use physical elements and material properties to discourage improper use. For example, a preferred method of practicing this invention surrounds the finger guide device with a relatively hard and distinct ridge. While not felt as dangerously "sharp" this ridge is intended to feel uncomfortable to the subject user. When a finger is placed across this ridge, while not harmful, it is not comfortable because it applies a high pressure per square inch (PSI) to the skin across a very narrow ridgeline. This high pressure per square inch signals through the sense of touch that the pen is not being held correctly. The feel of the misaligned grip is said to feel unnatural and the user will instinctively reposition his or her grip for a more natural and comfortable feel. The natural tendency is to avoid gripping the pen against the outer ridge of the finger guide device, instead sliding the finger or thumb down into the finger guide device and onto the sensor (the desired position). It is in this correct position that holding the stylus feels both natural and secure (stable) to the subject user. The words stylus or pen, sometimes used interchangeably and as equivalents, as used herein include any elongated instrument held or gripped by a user and capable of writing on a surface.

Additional embodiments of the invention may include active feedback mechanisms including those designed to alert (and train) subjects regarding the correct positioning of their finger or feedback designed to alert subjects to the fact that they have been accepted into the system (which is to say that their fingerprint has been scanned, compared, and correctly matched). Sound may be used to "guide" the finger to the sensor. Visual indicators may also be used. Finally, physical movement such as vibration may be applied much like the stick shaker that alerts pilots of a stall warning when flying a plane. In another preferred embodiment of the finger guide device a pressure responsive movement with a feedback "click" may be used as a tactile (and audible) feedback signal to tell the user when the finger is in the guide with the proper range of touch pressure applied.

These feedback mechanisms may also be used to correct misuse of the system. For example, extreme pressure on the sensor or a lack of touch pressure can cause scanning problems. On occasion, subject users, perhaps frustrated by a false reject, may incorrectly conclude that more finger pressure will make the system work better. Overpressure can flatten minutiae and saturate the sensor and cause inability to resolve minutiae accurately. Conversely, the lack of pressure in the form of too light a touch may cause the minutiae to remain irresolvable by the sensor and a good image cannot be generated. In either case, a voice command or sound or other feedback means known to one skilled in the art of human factors engineering or ergonomics could be used to communicate the need to relax the grip or even to press or squeeze a bit harder. Voice or sound or other feedback means may communicate to the subject the need to lighten up touch pressure or lift the finger a bit. Another viable solution is to move the sensor up of down slightly in the finger guide device sensor window, either my manual adjustment or automatically using a feedback control loop and actuator system, such means being known to those skilled in the art of electromechanical feedback control systems.

A preferred method of practice for this invention is an assembly with the sensor and finger guide device designed to work together as one unit, which is to say a system. This requires configuring the sensor for operation on a circuit board, likely containing additional support circuitry for its application. The combination of finger guide device, sensor, sealing gasket, and printed wiring board with mounting means may be mounted in the housing of a stylus or pen. As such, this subassembly may be placed in a variety of different style stylus or pen housings for its application.

The finger guide device of the present invention and a system for fingerprint matching of a writer may be combined with other biometric matching methods to render an even more secure overall result. Examples include, but are not limited to facial recognition, additional fingerprints, iris recognition, or retinal scanning. In another example, dynamic signature verification or "DSV" captures and digitizes several static and dynamic human signature elements during the physical rendering of a human signature (signing) and statistically analyzes a variety of parametric measures of these elements for comparison with identified stored parametric data compiled from previously rendered signature data (signature template or even a group of identified signature templates. A match would result in authentication or identification of the subject through his rendered signature. There are several ways to perform this dynamic signature verification known to those skilled in the art, an example of one such method being taught and claimed in U.S. Pat. No. 5,559,895 (Lee et al.), "Adaptive method and system for real time verification of dynamic human signatures", wherein measures of "personalized features" in the form of static and dynamic measures are compared with enrolled signature features to provide "accurate signature discrimination," and this patent and related prior art are herein incorporated by reference.

The need also arises to verify, perhaps from a remote location, that a known signer has actually rendered his signature rather than an alternative undesirable writing such as the words, "I object" or "I don't agree." In 2002, the Corporate Fraud and Accountability Act, also known as the Sarbanes-Oxley law, included a requirement that certain officers in public corporations certify required financial statements filings; and, in turn, may corporations require supporting certifications from key managers at remote operating locations. Such filings are normally under strict deadlines and therefore the ability to complete the supporting signature process electronically is desirable. Internet motivated needs to facilitate many other forms of remote commerce provide an equally compelling motivation for a method of verifying that an actual legally valid signature has been rendered, including the same need "to require the adoption and utilization of digital signatures by Federal agencies and to encourage the use of digital signatures in private sector electronic transactions" effected by United States legislation, called US eSign Bill, passed in October of 2000, upholding the legal validity of electronic or "digital" signatures. Using a paperless system, a fingerprint sensing pen system alone would not prevent such an individual from writing "I refuse to sign" or some other writing rather than a signature indicating his agreement thus representing his will. Detection of such exceptions would require human review of each rendered signature (and perhaps even comparison with a filed "signature card"), which is also subject to human error or oversight. Accordingly, another preferred embodiment of the finger guide device of the present invention is to combine the fingerprint authentication and identification system with a dynamic signature verification system used for the purpose of confirming that the authenticated subject actually signed a valid rendering of his signature.

A signer may be under duress during writing or signing; for example, a crime might be underway wherein a writer might be at gunpoint and forced to sign. In such a circumstance, it may be desirable for the writer to have a different emergency digit enrolled for use as an emergency signal that the writing is under duress or even forced illegally. In such a case, the system cannot match the enrolled fingerprint, but it will recognize a match with the writer's emergency finger and recognize the meaning of this match as a communication of distress from the subject writer. The subject writer may call this specially enrolled digit his "911 finger. This emergency digit or 911 finger match may be processed as an instruction to trigger so-called "silent alarms" to provide aid (e.g. police assistance) to the subject writer. In addition, the system, rather than reject the writer, could in the alternative appear to malfunction or for other reason than subject writer's failure to authenticate, be rendered unable to complete the transaction or otherwise delay the transaction pending the arrival of emergency assistance (e.g. police), such method intended to minimize the risk of harm to the subject writer.

Fingerprint sensors or scanners use a variety of solutions to sense and capture image data detailing features of a human fingerprint. In this discussion, the use of the words finger and fingerprint are intended to be the same and equivalent to the use of the word thumb or thumbprint and refer to the minutiae or living tissue growing out to become surface minutiae on any digit of any left or right appendage of a subject user. In this discussion, if a subject user is referred to as he or she or his or her, the use of these words in intended to be the same and equivalent without any designation of gender.

For a more complete understanding of the finger guide device of the present invention, reference is made to the following detailed description and accompanying drawings in which the presently preferred embodiments of the invention are shown by way of example. As the invention may be embodied in many forms without departing from the spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 3A discloses a side view of the preferred embodiment of the finger guide device used with a stylus of FIG. 1 including the finger guide device of the present invention, the stylus being wireless; and FIG. 3B discloses a side view of a second preferred embodiment of the finger guide device used with a stylus of FIG. 1 including the finger guide device of the present invention, the stylus being tethered.

DETAILED DESCRIPTION OF THE PREFERRED EMBODIMENTS

Figure 1:
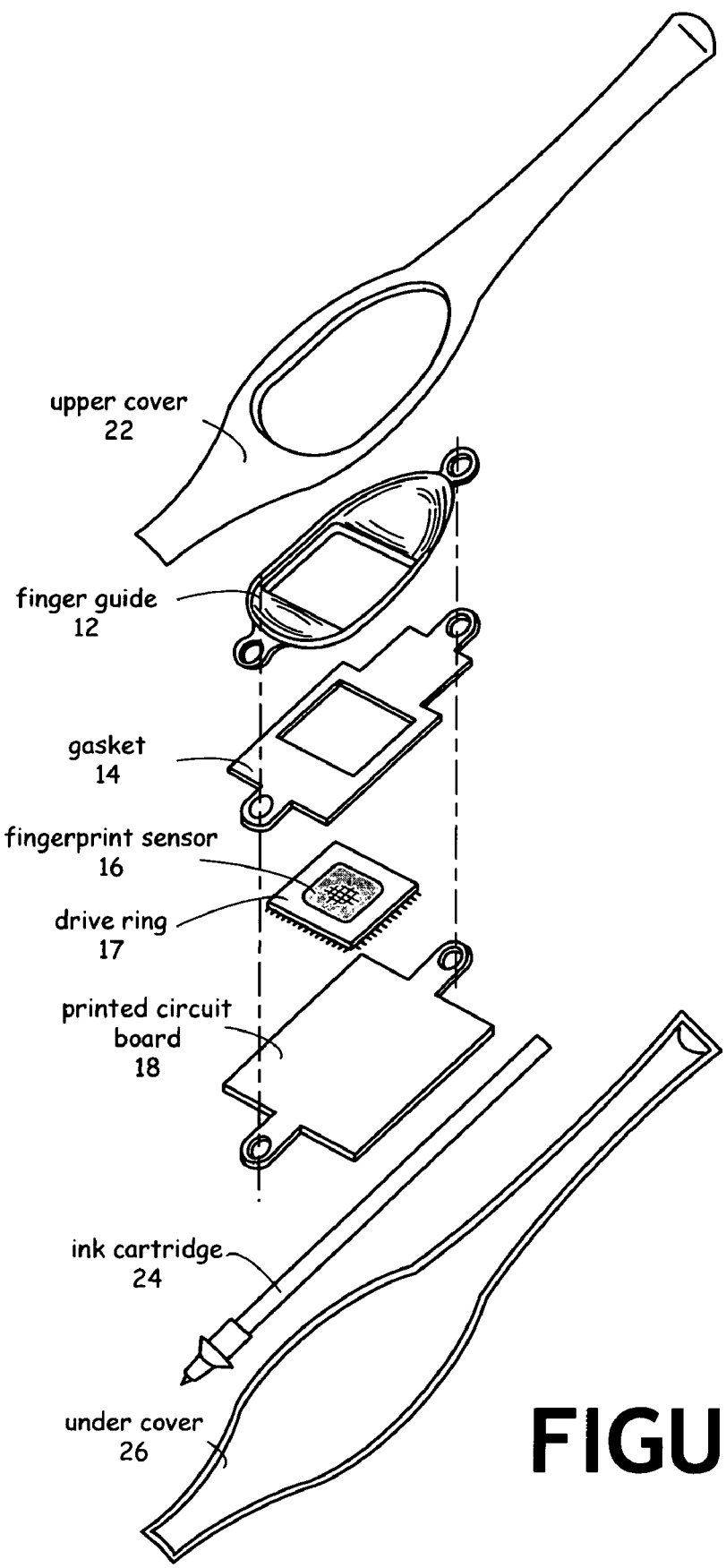
FIG. 1 is an exploded view assembly drawing of a preferred embodiment of the finger guide device of the present invention, comprising the finger cup, gasket, sensor, and printed circuit board for mounting above an ink cartridge within upper and lower shells of an ink-pen stylus.

Referring now to the drawings, in FIG. 1 the finger guide device 12 appears at the top of the exploded view just below the upper cover 22, and contains several preferred elements. These include left and right sides steeper than the front and back and of a concave nature, particularly in the areas proximal to the fingerprint sensor 16. The front of the finger guide device is concave from the sensor window to the top ridge and has shape derived from a short set of radii to create its generally concave contour. The rear section radii create the least steep concave contour and are meant to cup the portion of the finger or digit between the preferred print and the remainder of the digit adjacent to the body. The end of the finger guide device furthest from the fingernail contains a continuation of the feedback ridge but is not intended to use the finger joint or skin ridge under the joint as a means for positioning the finger adjacent to the sensor 16.

The sides of the finger guide device form a recess that receives the finger of the user. Accordingly, the sides of the finger guide device have the same general shape as the finger.

In the first preferred embodiment of the finger guide device of the present invention the sides are concave, having a varying radius of curvature. This includes a relatively short concave radius (or relatively steep slope) at the front of the finger guide device where the finger tip just below the finger nail touches or is proximal to the front of the finger guide device and a longer radius concave shape (or less steep slope) adjacent to the opposite side of the sensor where the guide extends up the finger towards the body. The sides are quite steep in the area of the fingerprint sensor to keep the finger centered laterally. Overall, the finger guide device is sized for an average finger, yet accommodates a wide range of digit sizes because it only interfaces with a small portion of the finger or digit.

The finger guide device 12 contains a window for the sensor 16 and drive ring 17 to reveal these elements in alignment with a relevant portion of the subject digit or finger. The AES3400 sensor or AES3500 sensor both manufactured by AuthenTec in Melbourne, Fla. would both be equally suitable as fingerprint sensors to sit within this window. This window may be sufficient to contain a drive ring needed for certain types of sensors (shown) or it may cover the drive ring and substitute its own electrical conductivity for that provided by a drive ring. Within the field of possible preferred embodiments this may also be the case and its performance is equivalent, aesthetics being the only substantive difference. In FIG. 1 the drive ring 17 is equivalently exposed and the finger guide device 12 is used as a supplement to the drive ring 17 and is conductive. In the field of possible preferred embodiments, the window opening may not be necessary for certain types of fingerprint scanners or sensors; however, alignment is a necessary element for all of the preferred embodiments.

The surface of the sensor lies on a plane with the top of the window in the lowest portion of the recess of finger guide device 12 and on the same proximal plane therewith; however, strict positioning with this plane is not critical to performance as long as the subject finger can contact both the finger guide device 12 and the sensor 16. The pliant and flexible nature of living fingers facilitates this within reasonable limits. Under some circumstances, performance may be further improved by adjusting the plane of the fingerprint sensor up or down to alter the fingerprint image characteristics. White there is slight utility gained from an optimal selection of vertical positions, the finger guide device of the present invention works well across a range of positions.

A gasket 14 (or equivalent protective means) is provided to keep oil, fluids, dirt, or other unwanted material away from the sensor leads and circuit board. This sensor 16 is made of a material that is impervious to solvents and other undesired contaminants. Other protective materials may be substituted for a gasket, such as conformal coatings applied in liquid form which solidify or partially solidify to create a protective barrier. The invention works with a variety of circuit board protective means available to and known to one skilled in the art. The invention will work without a protective means.

The finger guide device 12 contains one or more mounting bosses shown in this example preferred embodiment as opposite and adjacent. These are used to align the finger guide device 12 with the sensor 16 and gasket 14 with its printed wiring board 18 or other mounting means and, in turn, to mount the subassembly of sensor 16, gasket 14, and finger guide device 12 within the pen or stylus housing, comprising the upper cover 22 and mating under cover 26. This may be facilitated with any suitable mounting means known to one skilled in the art.

The front portion of the guide serves as a stop and location reference so designed to meet the fingertip or thumb below the nail and avoid differences in position which could be caused by differences in length of finger or thumbnail. This is a distinct advantage over devices that clamp over or cross over the top (nail) side of the finger.

Figure 2:
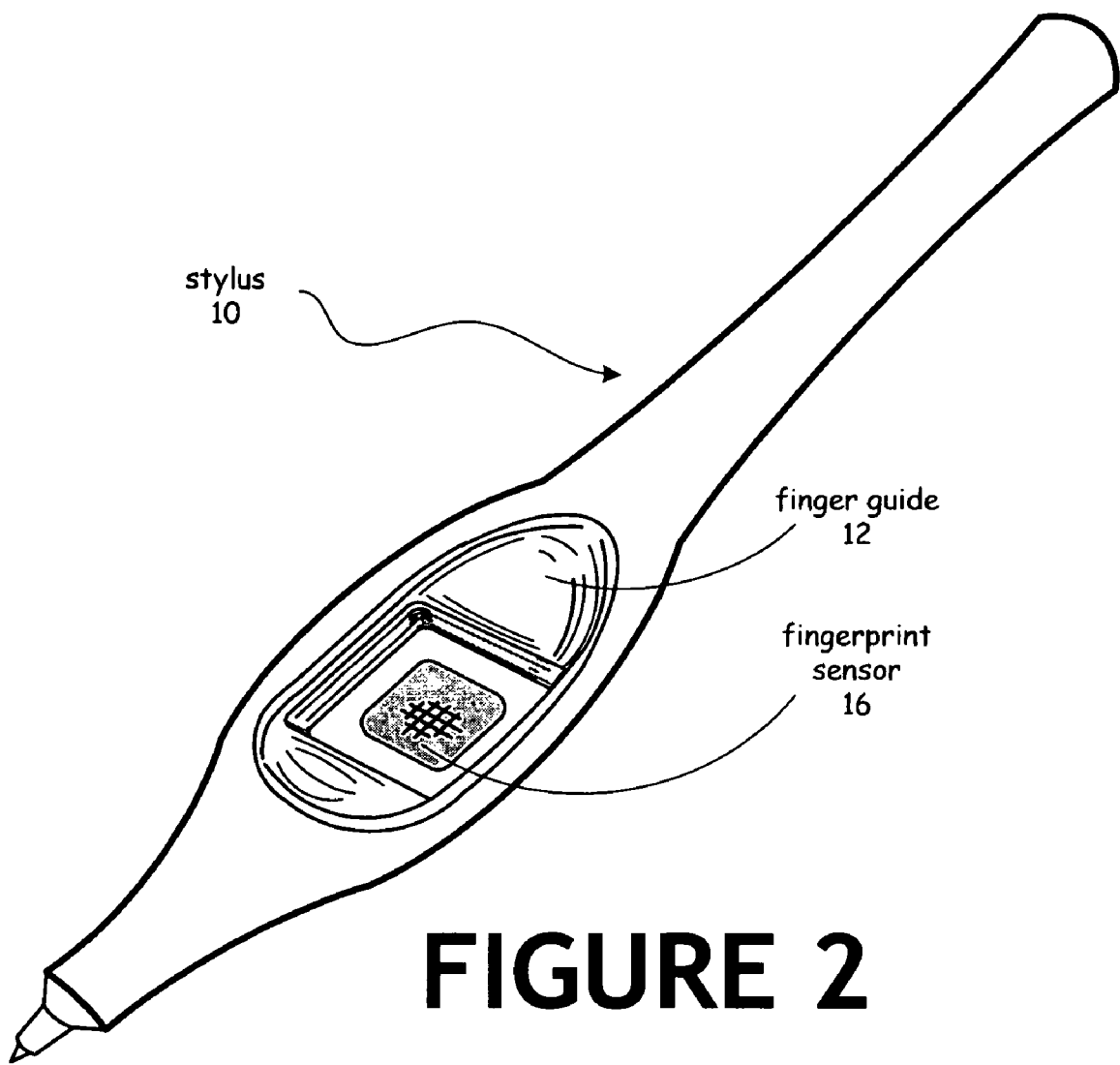
FIG. 2 discloses the preferred embodiment of the finger guide device of FIG. 1 mounted in a stylus, the stylus being used to authenticate and identify the subject user generating the writing wherein the subject uses the finger guide device to position generally the same relevant portions of the finger over the fingerprint sensor when gripping the pen.

FIG. 2 shows a finger guide device 12 and fingerprint sensor 16 system in a stylus 10 housing. The finger guide device 12 is displayed and the elements shown include left and right sides steeper than the front and back where proximal to the sensor and of a concave nature. The front is concave from the sensor window to the top ridge and has shape derived from a short set of radii to create its generally concave contour. The fingertip will contact this front portion of the finger guide device 12. The rear section radii create the least steep concave contour and are meant to cup the portion of the finger or digit between the preferred print and the remainder of the digit adjacent to the body. The end of the finger guide device 12 furthest from the fingernail contains a continuation of the feedback ridge but is not intended to use the finger joint or skin ridge under the joint as a means for positioning the finger adjacent to the sensor 16.

The finger guide device 12 contains a window for the sensor 16 to reveal itself in alignment to the subject digit or finger. This window may be sufficient to contain a drive ring needed for certain types of sensors (shown) or it may cover the drive ring and substitute its own electrical conductivity for that provided by a drive ring. In the preferred embodiments this may also be the case and its performance is equivalent, aesthetics being the only substantive difference. In FIG. 2 the drive ring surrounding the fingerprint sensor 16 is equivalently exposed and the finger guide device 12 is used as a supplement to the drive ring and is conductive. For certain types of scanners or sensors the invention works without an open window. Examples can include but are not limited to optical scanners or sensors and certain ultrasonic sensors.

FIG. 3A discloses a side view of the preferred embodiment of the stylus of FIG. 1 including the finger guide device 12 of the present invention, the stylus 10A being wireless; and FIG. 3B discloses a side view of a second preferred embodiment of the stylus of FIG. 1 including the finger guide device 12 of the present invention, the stylus 10B being tethered. The finger guide device is revealed exiting the top of the upper cover 22. A grip pad 29 is disclosed which is made of a soft and frictional (relatively high coefficients of friction) material intended to provide a more comfortable and stable grip. This non-slip grip surface attached to the under cover 26 helps keep the stylus from moving as the user removes and replaces the finger into the finger guide device during enrollment or in event of a second try following a false reject. Suitable pliant materials with high coefficients of friction are known to those skilled in the art and include but are not limited to rubber, urethane based materials, and suede leather.

Figure 4A:
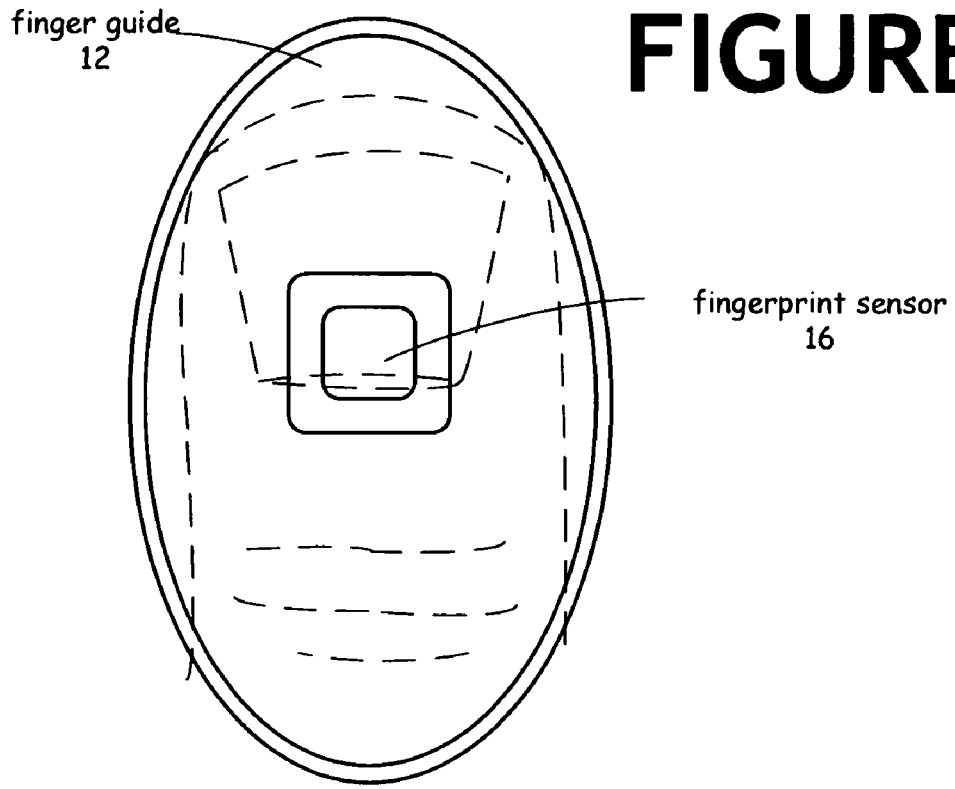
FIG. 4A discloses an overhead view of the preferred embodiment of the finger guide device for use with a stylus or pen of FIG. 1, with a finger mounted thereon, the finger being non-forcibly and naturally positioned onto the finger guide device enabling matching of a relevant portion of the fingerprint in alignment with the fingerprint sensor.
Figure 4B:
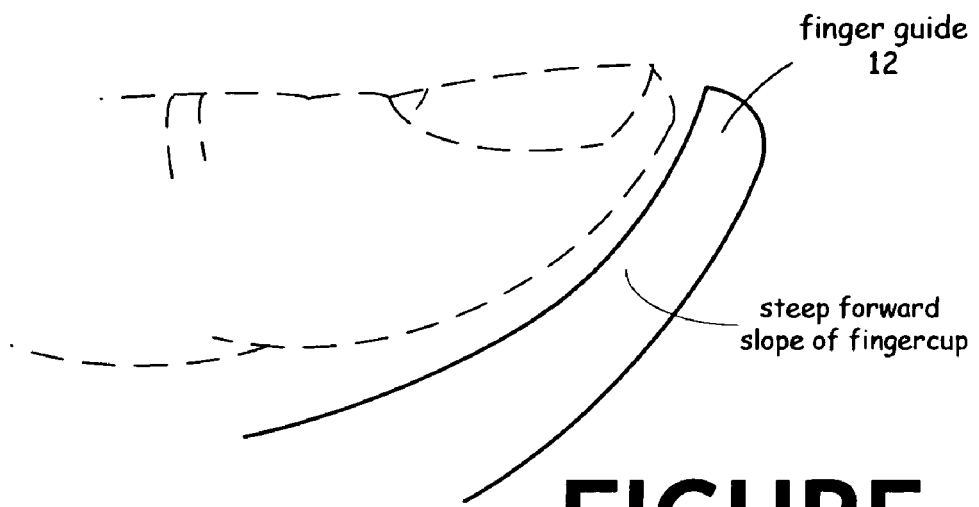
FIG. 4B discloses a side view of the steepened forward slope of the finger guide device aligning the finger In order to effect alignment of a relevant portion of the finger with the fingerprint sensor.

FIG. 4A discloses an overhead view of the preferred embodiment of the finger guide device 12 of FIG. 1, with a finger mounted thereon, the finger being positioned onto the finger guide device 12 enabling matching of a relevant partial image; and FIG. 4B discloses a side view of the steep forward slope 27 of the finger guide device aligning the finger so the relevant portion of the finger will align with the fingerprint sensor.

Figure 5A:
FIG. 5A discloses a preferred embodiment of a stylus including the finger guide device of the present invention and a fingerprint sensor mounted onto the grip of a stylus for a signature capture pad.
Figure 5B:
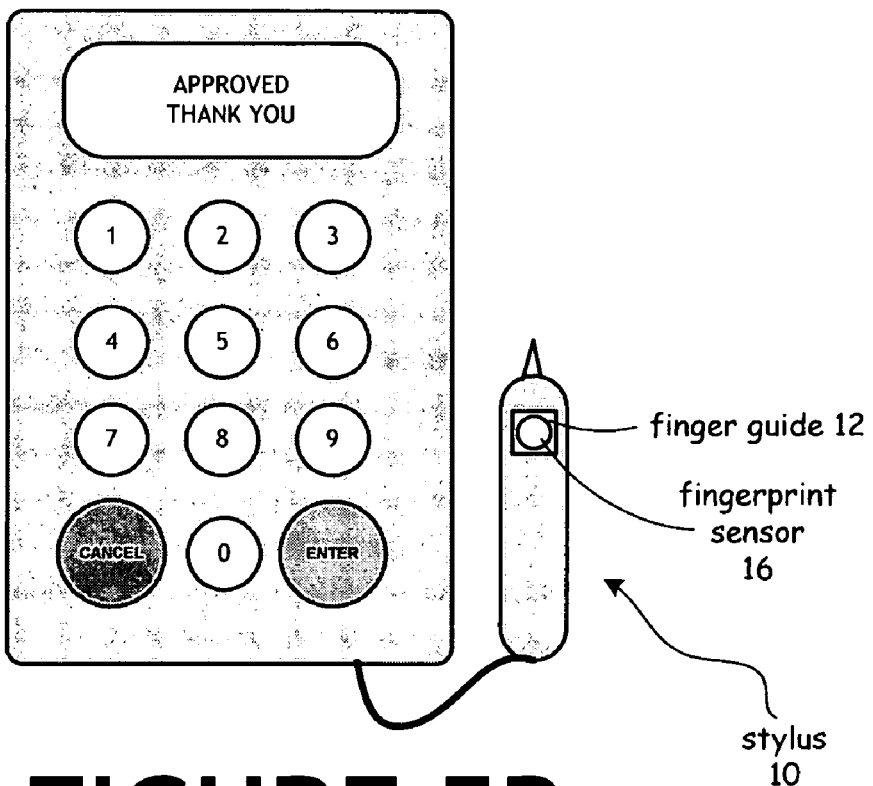
FIG. 5B discloses a preferred embodiment of a pen including the finger guide device and a fingerprint sensor mounted onto the grip of a pen stylus used in a point-of-sale payment terminal for signing purchase receipts.

FIG. 5A discloses another preferred embodiment of a stylus 10 including the finger guide device 12 and a fingerprint sensor 16 mounted onto the grip of the stylus for a signature capture pad commonly used as part of a payment processing system; and FIG. 5B discloses another preferred embodiment of a pen 34 including the finger guide device 12 and a fingerprint sensor 16 mounted onto the grip of the pen for use with a point-of-sale payment terminal wherein the purchaser signs receipts using the pen stylus while locating finger using the finger guide device of the present invention.

Figure 6A:
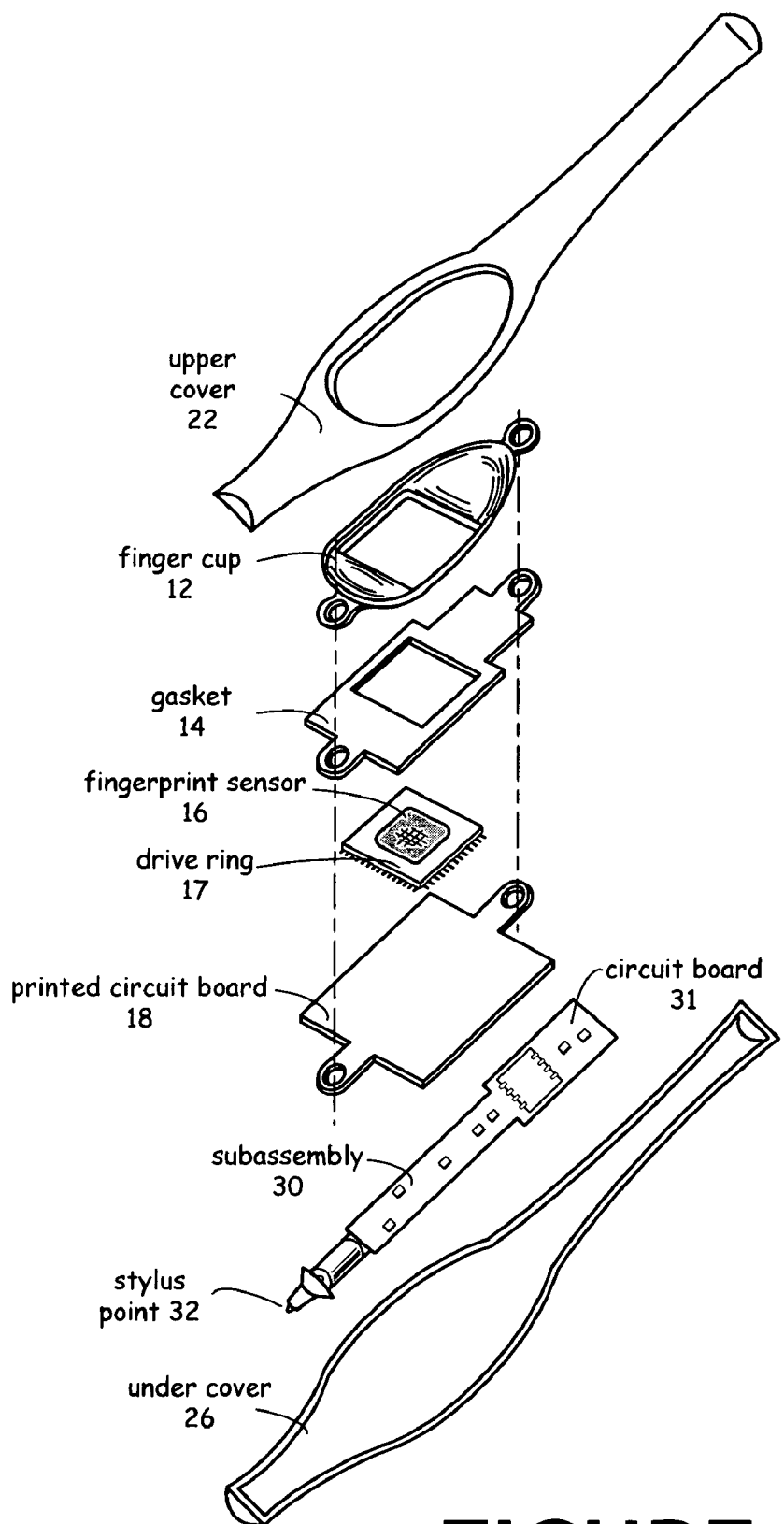
FIG. 6A discloses an additional preferred embodiment of an assembly drawing of an electrical stylus including the finger guide device of the present invention and a fingerprint sensor mounted in alignment and onto the grip of a stylus for use with a handwriting-digitizing pad to be used with a computer.
Figure 6B:
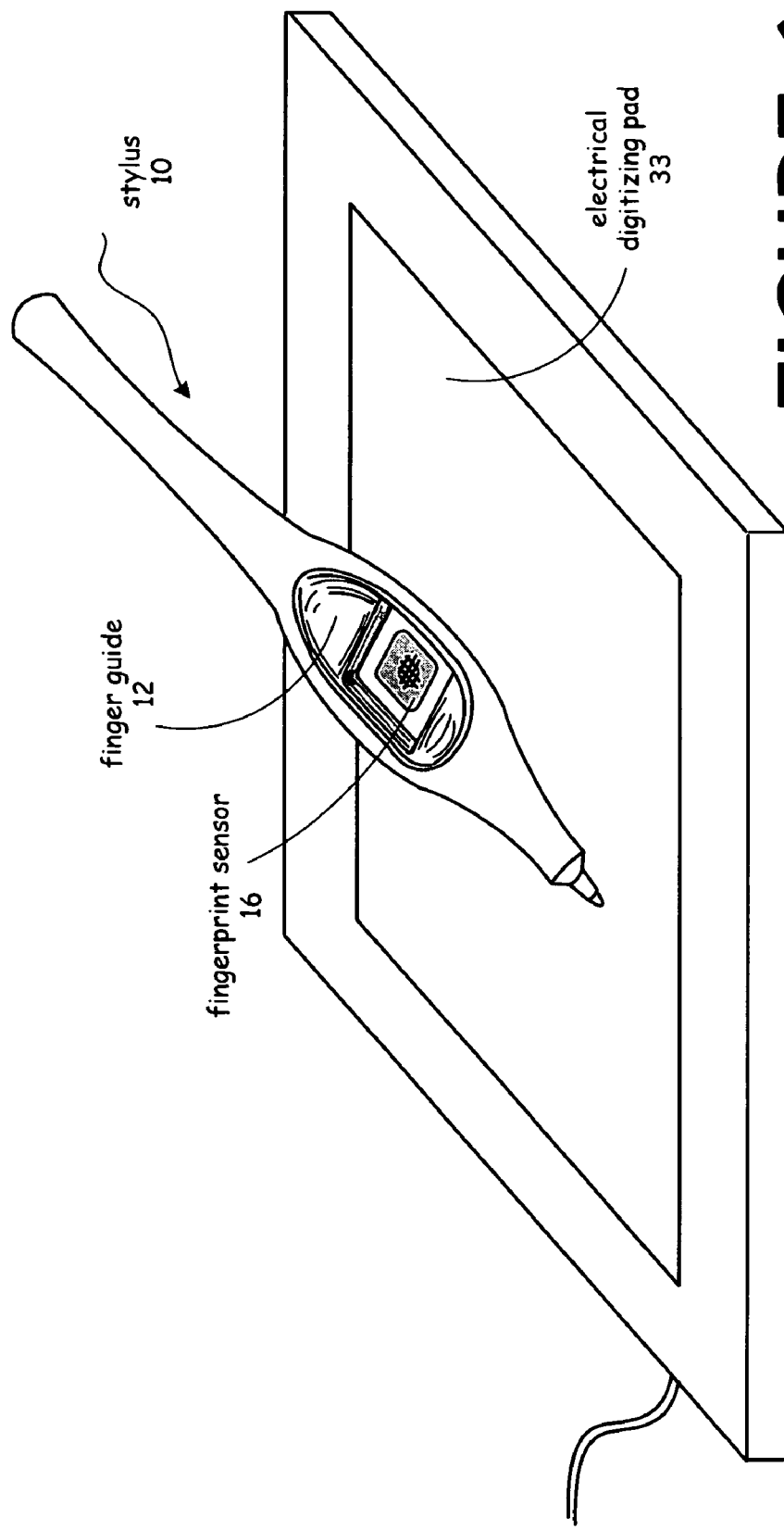
FIG. 6B discloses the additional preferred embodiment of FIG. 6A including an electrical stylus including the finger guide device and a fingerprint sensor mounted onto the grip of an electrical stylus used with a electrical digitizing pad.

FIG. 6A discloses another preferred embodiment of an assembly drawing of an electrical computer input stylus including the finger guide device 12 and a fingerprint sensor 16 to be mounted onto the grip of a stylus for use with a handwriting-digitizing means such as an electrical digitizing pad 33 (shown in FIG. 6B) or tablet computer; and FIG. 6B discloses a preferred embodiment of an assembled electrical computer input stylus including the finger guide device 12 and a fingerprint sensor 16 mounted onto the grip of the stylus 10 when used with its corresponding electrical digitizing tablet 33 to capture handwriting such as drawing, writing, or signatures for computer processing such as image capture and storage or dynamic signature authentication in conjunction with fingerprint authentication for a combined biometric authentication of a user. This additional preferred embodiment of the present invention uses a second security biometric identity verification method to be used with fingerprint authentication. In another preferred embodiment of the present invention the use of dynamic signature verification (DSV) combined with the finger cup device and fingerprint authentication or identification system is intended to confirm that the fingerprint authenticated signer has actually signed his signature indicating a legal expression of his agreement and will, rather than writing an objection or rendering other non-meaningful writing.

In yet another preferred embodiment of the present invention it may be desirable for the writer to have a different emergency fingerprint enrolled as an emergency signaling digit to indicate to the system that the writing is under duress or even forced illegally. In such a case, the system could not authenticate against the expected enrolled fingerprint, but would recognize the match with the writer's designated emergency finger which can be interpreted as the writer's request for emergency assistance. This emergency digit fingerprint match could be used to trigger "silent alarms" to provide emergency assistance to the writer. As an alternative to rejecting the subject writer, the system could be programmed to appear to malfunction or communicate other reason given for writer's failure to authenticate and simultaneously be rendered unable to complete the signing transaction process or otherwise delay the approval of the signing transaction pending the arrival of emergency assistance, such approach intended to minimize the risk of harm to the subject writer under duress. This additional preferred embodiment as well as the DSV alternative embodiments disclosed previously include use of a circuit board 31 and stylus point 32 to form a subassembly 30, which is in wireless communication with the electrical digitizing pad 33 shown in FIG. 6B.

This subassembly is described in detail in U.S. Pat. No. 5,576,502 and others cited therein all of which are herein incorporated by reference. Other equivalent subassemblies and subsystems designed to communicate with electrically operated digitizing pointer and handwriting capture pads or tablets are known to those skilled in the art of computer handwriting capture devices and systems. The additional embodiment uses a subassembly manufactured by WACOM Company Limited. In this additional embodiment, the circuit board, and stylus subassembly 30 replaces the ink cartridge 24 shown in FIG. 1 and this replacement makes the finger guide device enabled electrical computer input stylus compatible with computer handwriting-digitizing pads which use this wireless method of communication between stylus and pad. FIG. 6A discloses an exploded view of a finger guide device fingerprint sensor system in a stylus housing. The finger guide device 12 is displayed and the elements shown include left and right sides steeper than the front and back and of a concave nature. The front is concave from the sensor window to the top ridge and has shape derived from a short set of radii to create its generally concave contour. The fingertip will contact this front portion of the finger guide device 12. The rear section radii create the least steep concave contour and are meant to cup the portion of the finger or digit between the preferred print and the remainder of the digit adjacent to the body. The end of the finger guide device furthest from the fingernail contains a continuation of the feedback ridge but is not intended to use the finger joint or skin ridge under the joint as a means for positioning the finger adjacent to the sensor 16. The finger guide device 12 contains a window for the sensor 16 to reveal itself to the subject digit or finger. This window may be sufficient to contain a drive ring needed for certain types of sensors (shown) or it may cover the drive ring and substitute its own electrical conductivity for that provided by a drive ring 17. In the additional preferred embodiment this may also be the case and its performance is equivalent, aesthetics being the only substantive difference. In FIG. 6A the drive ring is equivalently exposed and the finger guide device is used as a supplement to the drive ring and is conductive.

FIG. 6B discloses the electrical computer input stylus writing mechanism in FIG. 6A in radio frequency electrical communication with the electrical digitizing pad 33 shown in FIG. 6B wherein the digitizing pad sends electrical signals containing information on the handwriting to a computer. A stylus may be used for handwriting that is digitally captured and transferred into a computer and this is preferable in this application to attempting to use a traditional computer mouse because a mouse is not reasonably capable of rendering handwriting. In addition, a stylus in this configuration may also serve as a both a computer pointing control device and a handwriting capture device, but, as noted, a mouse is limited to a pointing control device and is not a stylus. Before or during use of the stylus for its purpose, electrical signals containing information on the fingerprint may also be sent to the computer either via the digitizing tablet, by wireless signal transmission and reception, via optical transfer of data, or through a separate cable in electrical communication with the computer with no substantive difference in the resulting practice and usefulness of the present invention.

Throughout there are various patent applications which are referenced by application number and inventor. The disclosures of these applications in their entireties are hereby incorporated by reference into this specification in order to more fully describe the state-of-the-art.

It is evident that many alternatives, modifications, and variations of the locating device of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10 STYLUS
12 FINGER CUP
14 GASKET
16 FINGERPRINT SENSOR
17 DRIVE RING
18 PRINTED CIRCUIT BOARD
22 UPPER COVER
24 INK CARTRIDGE
26 UNDER COVER
29 GRIP PAD
30 SUBASSEMBLY
31 CIRCUIT BOARD
32 STYLUS POINT
33 ELECTRICAL DIGITIZING PAD

I claim:

1. A finger guide device for mounting over a fingerprint sensor, the fingerprint sensor being disposed in the grip of a stylus or pen, said fingerprint sensor being integral to the stylus or pen, the finger guide device having concave sidewalls, the concave sidewalls having the same general shape as a finger, the surfaces having a coefficient of friction that is sufficiently low for enabling the finger to slide downwardly until reaching a stable position of global minimum, the fingerprint sensor being disposed in a position of the global minimum relative to the concave sidewalls, the concave sidewalls being ergonomically designed to guide the finger of a user onto the fingerprint sensor in essentially the same position in an axial direction and in a lateral direction, the finger guide device enabling generally the same relevant portions of the finger to rest in a stable position onto the fingerprint sensor repeatably each time the stylus or pen is used to generate a writing, the finger guide device reducing the incidents of "false rejects" for purposes of identification or authentication of a person using the stylus or pen;

wherein tactile feedback guides the finger to the same location over the position of global minimum through communication to the user each time the stylus or pen is used.

2. The finger guide device in claim 1 having convex sides with varying radii of curvature, such radius on the front side being designed to position generally the same relevant portions of the finger over the center of the sensor in a region on the finger ranging from between 0.20 inches to 0.90 inches from the lower side of the finger nail.

3. The device in claim 1 with a higher thermal conductivity than other parts of the pen or stylus so that as heat is conducted away from the skin more rapidly by said device than by the other parts of the pen so the device has a tactile property of feeling cooler to the touch than other portions of the pen, thereby communicating to the writer that the finger is placed in the correct area.

4. The device in claim 1 with one or more mounting bosses attached for alignment and attachment to the stylus.

5. The finger guide device of claim 1, wherein the stylus is electrical in nature and in communication with a handwriting-digitizing pad.

6. A finger guide device for mounting in alignment with a fingerprint sensor, the fingerprint sensor being disposed in the grip of a stylus or pen, said fingerprint sensor being mounted in the housing of said stylus or pen, the finger guide device having concave sidewalls, the finger guide device enabling relevant portions of a fingerprint to be captured when the pen or stylus is used during a registration process, the finger guide device having the same general shape as a finger, the surfaces having a coefficient of friction that is sufficiently low for enabling the finger to slide downwardly until reaching a stable position of global minimum, the fingerprint sensor being disposed in a position of a global minimum relative to said finger guide device, the finger guide device guiding the finger of the user onto the sensor in essentially the same position in an axial direction and in a lateral direction, the finger guide device enabling generally the same relevant portions of the finger to rest in a stable position onto the fingerprint sensor repeatably each time the stylus or pen is subsequently used to generate a writing; the finger guide device reducing the incidents of "false rejects" for purposes of identification or authentication of a person using the stylus or pen;

wherein the concave sidewalls in the axial direction adjacent to the tip of the user finger, in use, are more steeply sloped than the concave sidewalls in the axial direction which are remote from the tip of the user finger; and wherein tactile feedback guides the finger to the same location over said position of global minimum through communication to said user each time said stylus or pen is used even when substantial time has passed between said registration process and the authentication event.

7. The finger guide device described in claim 6 with bumps to assist subjects placing their digit in the right position in the finger guide device.

8. The finger guide device described in claim 6 with Braille to communicate to subjects placing their digit in the right position in the finger guide device.

9. The finger guide device described in claim 6, whereby the finger guide device or finger guide device surface is conductive or partially conductive to communicate a necessary electrical signal, frequency or potential to the human tissue in order to facilitate improved operation of the sensor.

10. The finger guide device described in claim 6, whereby the finger guide device or surrounding area is marked with visual indicators or even a painted fingerprint to indicate that this is where to place the finger.

11. The finger guide device of claim 6, wherein the stylus is electrical in nature and in communication with a handwriting-digitizing pad.

12. A device for positioning a finger onto a fingerprint sensor, the fingerprint sensor being disposed in the grip of a stylus or pen, the finger guide device comprising:
  a. the finger guide device having a generally recessed shape dimensioned for receiving a finger, the same finger guide device being adaptable for use with many different sized fingers, the finger guide device having concave sidewalls, the concave sidewalls having a forward portion having at least one slope, said slope abutting the tip part of the finger underneath the fingernail, the forward portion of the concave sidewalls acting as a stop, the stop physically but non- forcibly encouraging the finger into the correct position relative to the fingerprint sensor, the forward portion meeting the finger tip below the fingernail; and
  b. the fingerprint sensor abutting the finger guide device;
  wherein the finger guide device guides the finger onto the fingerprint sensor in essentially the same position in an axial direction and in a lateral direction, the finger guide device enabling generally the same relevant portions of the finger to rest in a stable position onto the fingerprint sensor repeatably each time the stylus or pen is used to generate a writing, said fingerprint sensor being integral to the stylus or pen, the finger guide device reducing the incidents of "false rejects" for purposes of identification or authentication of a person using the stylus or pen; and
  wherein the finger guide device has a shorter radius of curvature at the forward portion where the finger tip abuts the finger guide device and a longer radius of curvature at the opposite end where the guide extends up the finger towards the body.

13. The finger guide device of claim 12, wherein the stylus is electrical in nature and in communication with a handwriting-digitizing pad.

14. The finger guide device of claim 12, wherein the stylus is used with a system capable of dynamic signature verification used to verify that the writer has signed a signature belonging to the writer.

15. The finger guide device of claim 12, wherein the stylus is used with a system capable of dynamic signature verification wherein said dynamic signature verification system is also available for use as a way to authenticate or identify the writer.

16. The finger guide device of claim 12, wherein the subject has enrolled a second emergency digit fingerprint for use communicating an emergency distress signal, the match of which is a signal to the system to respond differently.

17. The finger guide device of claim 12, wherein the stylus is used as a computer pointing control device capable of authenticating the subject user before or while controlling the movement of the pointing device.

18. A finger guide device for mounting in alignment with a fingerprint sensor, the fingerprint sensor being disposed in the grip of a stylus or pen, said fingerprint sensor being integral to the stylus or pen, the finger guide device having sidewalls that form a recess for receiving a finger of a user, the same finger guide device being adaptable for use with many different sized fingers, the fingerprint sensor being disposed in a position of a global minimum relative to the sidewalls of said finger guide device, the recess having the same general shape as a finger;
  wherein the finger guide device aligns the finger with the sensor in essentially the same position in an axial direction for placement of a relevant portion of a finger onto the fingerprint sensor, said axial alignment occurring along a forward and backward portion of the finger guide device;
  wherein the finger guide device aligns the finger with the sensor in essentially the same position in a lateral direction for placement of a relevant portion of a finger onto the fingerprint sensor, said lateral alignment occurring between side edges of the finger guide device; and
  wherein the stylus or pen is mounted in a handwriting-digitizing pad to be used with a computer, the finger guide device enabling a relevant portion of the finger to rest in a stable position onto the fingerprint sensor each time authentication or confirmation is needed, the finger guide device reducing incidents of "false rejects" for purposes of identification or authentication of a person touching the finger guide device; and
  wherein tactile feedback guides the finger to the same location over the position of global minimum through communication to the user each time the handwriting-digitizing pad is used.

19. The finger guide device described in claim 18, whereby tactile feedback guides the finger to the same location over said position of global minimum through communication to said user each time said stylus or pen is used.

20. A finger guide device for mounting in alignment with a fingerprint sensor, the fingerprint sensor being disposed in the grip of a stylus or pen, said fingerprint sensor being disposed in the stylus or pen, the finger guide device having concave sidewalls, the concave sidewalls having the same general shape as a finger, the fingerprint sensor being disposed in a position of a global minimum relative to the concave sidewalls, the concave sidewalls being ergonomically designed to guide the finger of a user onto the fingerprint sensor in essentially the same position in an axial direction and in a lateral direction, said finger guide device and said fingerprint sensor being mounted onto the grip of a pen or stylus used in a point-of-sale payment terminal, said finger guide device enabling a relevant portion of the finger to rest in a stable position onto the fingerprint sensor each time authentication or confirmation is needed at said point-of-sale payment terminal, said finger guide device reducing incidents of "false rejects" for purposes of identification or authentication of a person touching the finger guide device, tactile feedback guiding the finger to the same location over said position of global minimum through communication to said user each time said stylus or pen is used:
  wherein the finger guide device has a forward portion having at least one slope, said slope abutting the tip part of the finger underneath the fingernail, the forward portion of the finger guide device acting as a stop and a location reference, the forward portion meeting the fingertip below the fingernail, the stop serving as the reference for positioning the finger relative to the fingerprint sensor; and wherein the concave sidewalls have a shorter radius of curvature at the forward portion where the finger tip abuts the finger guide device and a longer radius of curvature at the opposite end where the guide extends up the finger towards the body.

21. The finger guide device described in claim 20, whereby tactile feedback guides the finger to the same location over said position of global minimum through communication to said user each time said point-of-sale payment terminal is used.

* * * * *